(No Model.)
W. H. McDANIEL & U. PERRINE.
VEHICLE SPRING.
No. 279,783. Patented June 19, 1883.
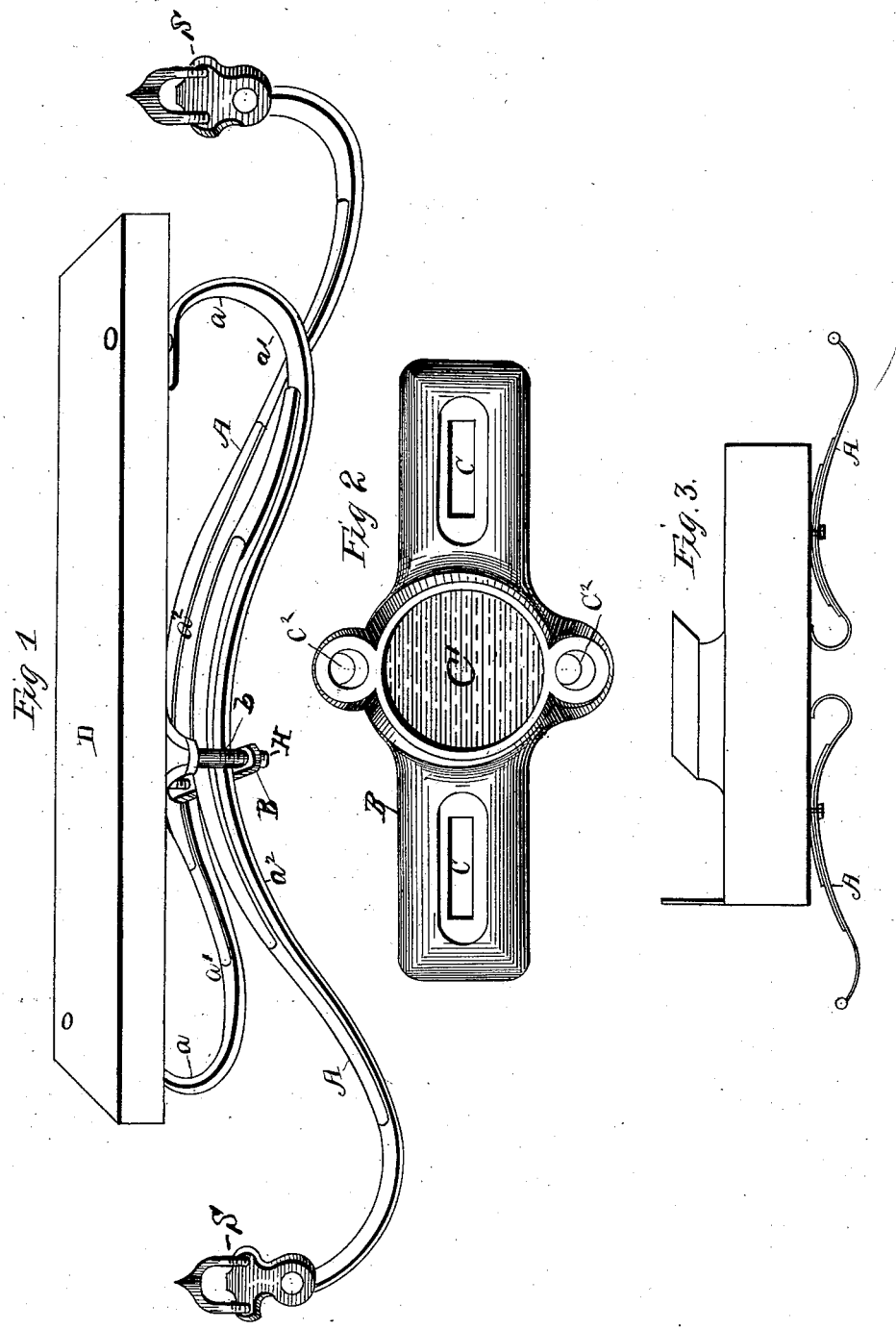
WITNESSES
W. E. Bowen.
Geo. H. Hawey.
INVENTOR
William H. McDaniel
Upton Perrine
By Myers & Co.
Attorneys.

UNITED STATES PATENT OFFICE.

WILLIAM H. McDANIEL AND UPTON PERRINE, OF WICHITA, KANSAS.

VEHICLE-SPRING.

SPECIFICATION forming part of Letters Patent No. 279,783, dated June 19, 1883.

Application filed February 23, 1883. (No model.)

*To all whom it may concern:*

Be it known that we, W. H. McDANIEL and U. PERRINE, citizens of the United States of America, residing at Wichita, in the county of Sedgwick and State of Kansas, have invented certain new and useful Improvements in Vehicle-Springs, of which the following is a specification, reference being had therein to the accompanying drawings.

This invention pertains to an improvement in vehicle-springs adapted alike for vehicles of carrying as well as of riding capacities to overcome reaction, produce equality of pressure, and to prevent breakage; and the invention consists in the construction and combination of the parts, substantially as hereinafter more fully set forth and claimed.

In the accompanying drawings, Figure 1 is a perspective view of my improved spring. Fig. 2 is a view of an adjunctive part of the same. Fig. 3 shows my invention applied to a vehicle in duplicate form.

In carrying out my invention I employ two springs, A A, each having an upward-curved and recurved end, $a$, which is adapted to be bolted to the front bar of or to the side of the vehicle-body, as shown, respectively, in Figs. 1 and 3. From this point it is concaved, as at $a'$, with the concavity facing downward and passing through a staple or clip, H, consisting of two parallel bolts, $b$, depending from the front bar of or from the body itself, and of a plate, B, fitted upon said bolts. A short distance from this point—that is, from where it passes through its clip—each spring is curved downward, as at $a^2$, and finally curved upward, where it is provided with the shackle S and there shackled or clipped to the axle-bolster.

B is a plate, which is fastened to spring-block D. It has slots C near its ends, that may be adapted to permit its adjustment to the under side of the body, while in a depression in its center is secured a rubber cushion, C', to afford a proper or yielding bearing for the convexities of the springs where they pass through the staples $b\ b$. The plate B has also two bolt-holes, C², to enable its connection with the bolts $b$ of clip H above the springs. A clip, H, is applied to each spring, and also a plate, B, with its rubber cushion C'. This form of spring is adapted to overcome reaction and to prevent breakage as the vehicle passes over ruts or obstacles, and as a self-equalizing spring is unsurpassed.

We are aware that in the construction of vehicle-springs they have been attached to the body of the vehicle and to the axle-bolsters in a manner substantially similar to that shown in our invention; but

What we claim, and desire to secure by Letters Patent, is—

The combination of the springs A, secured to spring-block D and axle-bolsters, and rubber cushion C', secured in a depression in plate B, having bolt-holes C² and slots C, substantially as shown, and for the purpose described.

In testimony whereof we affix our signature in presence of two witnesses.

WILLIAM H. McDANIEL.
    UPTON PERRINE.

Witnesses:
    A. H. FALRIQUE,
    N. N. MILLER.